March 9, 1954 H. A. HULSBERG 2,671,337
HYDROGEN ANALYZER
Filed March 31, 1951
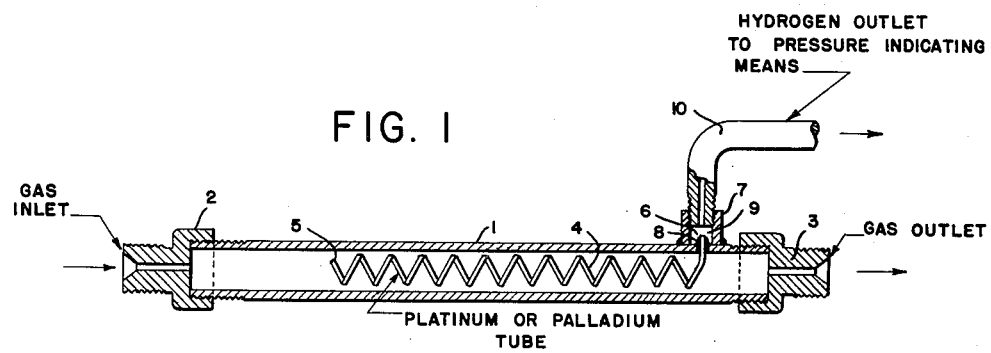
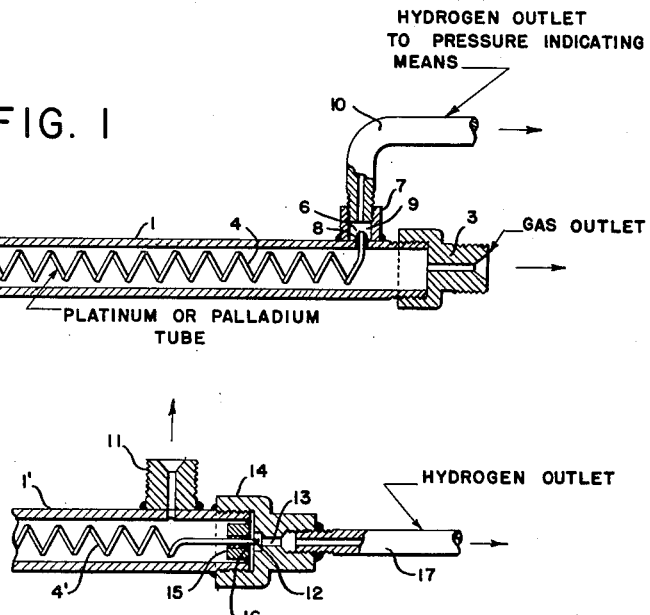
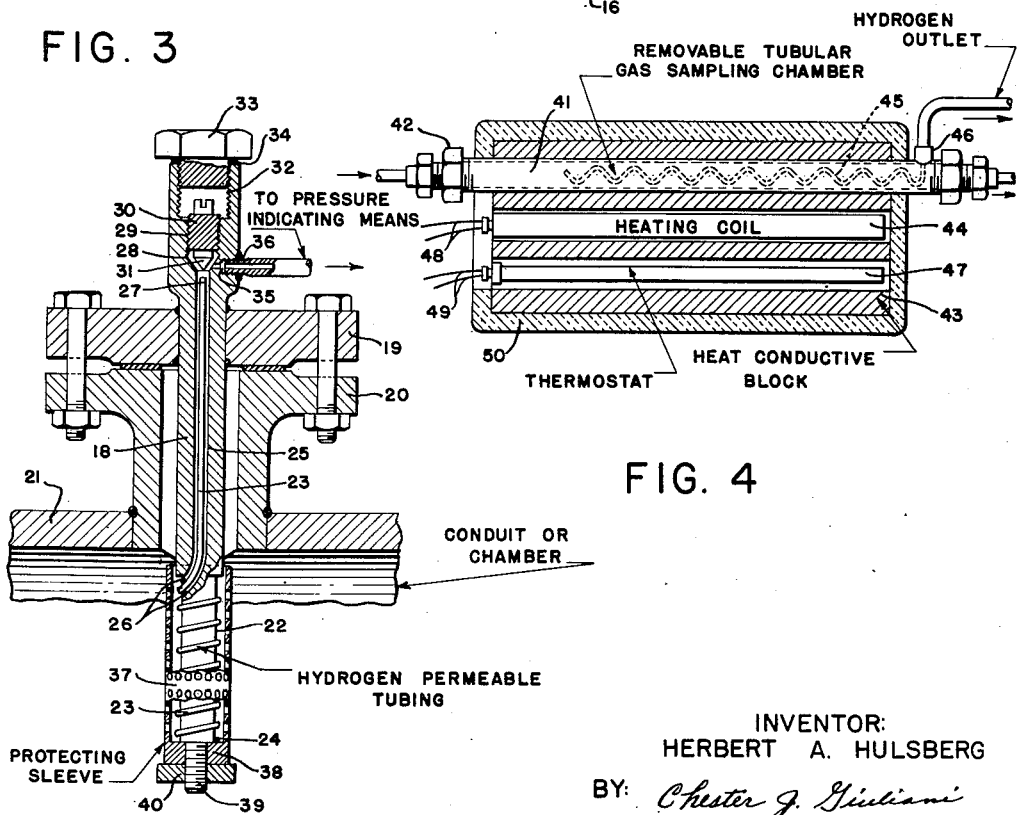
INVENTOR:
HERBERT A. HULSBERG
BY: Chester J. Giuliani
Philip T. Liggett
ATTORNEYS:

Patented Mar. 9, 1954

2,671,337

UNITED STATES PATENT OFFICE 2,671,337

HYDROGEN ANALYZER

Herbert A. Hulsberg, Clarendon Hills, Ill., assignor to Universal Oil Products Company, Chicago, Ill., a corporation of Delaware Application March 31, 1951, Serial No. 218,669

5 Claims. (Cl. 73—23)

This application is a continuation-in-part of my presently filed application Serial No. 130,153, filed November 30, 1949.

The present invention relates to an improved type of gas detection apparatus, and more particularly to a meter or analyzing device for measuring the concentration of hydrogen passing in admixture with other gases or vapors through a confined chamber or conduit.

Apparatus of this general type is operated by utilizing a wall or diaphragm which is permeable to hydrogen, such that the pressure of hydrogen in a separate zone may be measured and compared to the total pressure of the gaseous mixture within a given zone or flow stream. Actual measurement of the hydrogen concentration is made in accordance with the law of partial pressures, in other words, the pressure exercised by each component in a gaseous mixture is proportional to its concentration in the mixture, and the total pressure of the gas is equal to the sum of the partial pressures of its components. It has been found that palladium and platinum are materials which are permeable to hydrogen and are thus particularly adaptable for partitioning or separating the hydrogen partial pressure zone from that of the main gaseous stream.

The usual type of instrument for measuring hydrogen concentration by the principle of diffusing it through a hydrogen permeable member, utilizes generally a diaphragm plate, short tube, or cylindrical section to form the partitioning member and while the operation of this type of device may be fairly satisfactory, there is usually an undesirable relatively long lag in the indication of gas concentration due to the time element for the gas to permeate the membrane and build up the partial pressure, or conversely to lower the partial pressure in accordance with the varying concentration of the hydrogen in the total gas mixture.

It is therefore, a principal object of this present invention to provide an improved form of analyzing or metering device which to a considerable extent eliminates the lag in measuring hydrogen concentration, where the latter is to be measured by the partial pressure thereof within a zone separated from the gaseous mixture by a hydrogen permeable member.

It is a further object of the present invention to provide an improved gas measuring instrument, which utilizes an elongated or extended length of small diameter tubing in contact with and exposed to the gaseous mixture, and thus provides a large surface area which is permeable to the gas to be measured, while providing a relatively small internal volume for collecting the permeating gas.

It is a still further object of the present invention to provide modified forms of construction embodying an extended length of small bore and small diameter permeable tubing, whereby the latter may be placed in either a conduit or a chamber containing the gaseous mixture, including means for connecting the small diameter tubing to an external hydrogen outlet nozzle or the like and to suitable pressure indicating means.

Broadly, the present gas detection apparatus which is suitable for measuring hydrogen concentration in a gaseous mixture, comprises in combination, an extended length of small diameter and small bore hydrogen permeable tubing having a closed end and an open end, tube supporting means suitable for holding the closed end and the exterior surface of the extended length of small diameter tubing into contact with the gaseous mixture, passageway means through at least a portion of the supporting or holding means for the tubing and connective with the open end of the small diameter tubing, and an external hydrogen outlet nozzle connecting with the passageway means and the open end of said tubing whereby the nozzle may suitably connect with pressure indicating means.

It is a principal feature of the present invention to provide an apparatus which utilizes a small diameter tube for the hydrogen permeable member, however, more than one tube may of course be utilized within the one instrument. Where more than one hydrogen permeable tube is utilized, they may be straight, bent, or U-shaped, but preferably each of the plurality thereof has its open end connecting with a common hydrogen outlet nozzle. Where a single tubing is utilized, it may be in a preferable embodiment, coiled so that an extended length of the tubing may be utilized within a relatively small zone for exposure to the gaseous mixture. Also, a coiled form of tubing is more readily supported and protected within the confined chamber or conduit having the gaseous mixture. It is not intended to limit the present invention for use with any one particular size of small diameter tubing, however, the embodiments of this invention, as hereinbefore noted, utilize small diameter hydrogen permeable tubings so that a relatively large surface area in comparison to a small internal volume effects a small volume collecting zone for the hydrogen or other gas to be measured, and in turn provides an instrument which substantially eliminates the undesirable time lag in the usual type of diffusion membrane type of apparatus. Preferably, small diameter tubings, approaching capillary sizes, are utilized, say of the order of 1/16 inch I. D., or smaller. Also, the tubing walls are preferably relatively thin, in order to permit rapid diffusion of the hydrogen through the wall, however the wall thickness should be sufficient to withstand necessary differential pressure conditions as well as of such size as they may be soldered or otherwise readily connected to a passageway of hydrogen outlet means.

In a more specific embodiment the meter or analyzing device for measuring hydrogen concentration within a gaseous mixture, comprises in combination, a confined pressure tight housing having an inlet and outlet thereto for accommodating the flow of the gaseous mixture, an extended length of small diameter hydrogen permeable tubing having a closed end and an open end, means supporting the small diameter tubing within the housing whereby the closed end and exterior surface of the tubing is in contact with the gaseous mixture, passageway means through the supporting means and connective with the open end of the tubing, and a hydrogen outlet nozzle connecting with the passageway means and the open end of the small diameter tubing, whereby the outlet nozzle may suitably connect with pressure indicating means.

Where the device includes or provides a small pressure tight chamber for accommodating the flow of the gaseous mixture, which is to have the hydrogen concentration therein measured, the chamber or housing is preferably of an elongated tubular shape and the extended length of hydrogen permeable tubing may be bent, coiled, or otherwise compactly formed to readily fit into the tubular housing and be supported therein.

In a modified embodiment of the present invention, particularly adapted for measuring hydrogen concentration in a gaseous mixture within a large conduit or large chamber, there is provided in combination, a tube supporting rod carrying on at least a portion thereof an extended length of small diameter hydrogen permeable tubing having a closed end, the opposite end of the tubing being open and communicating with a passageway extending through another portion of the supporting rod, a hydrogen outlet nozzle from the latter portion of the tube supporting rod, and a pressure tight closure member mounted on said supporting rod between the hydrogen outlet nozzle and the extended length of hydrogen permeable tubing in a manner suitable for positioning and holding the rod and tubing within a chamber.

In this latter embodiment, the tube supporting rod is preferably relatively small in order that it may be inserted into and through a nozzle connecting with a chamber, or into a T or the like, in a large diameter pipe, and the hydrogen permeable tubing is preferably wrapped or coiled externally around the supporting rod so that it may be inserted into the chamber or conduit and have its closed end and external surface in contact with the gaseous mixture therein. The open end of the tubing is soldered or otherwise connected to a passageway extending through the tube supporting rod itself to the exterior end thereof and terminating at a hydrogen outlet nozzle which is also exteriorly of the chamber or conduit. It is also desirable in an embodiment of the type where the tubing is to be inserted into or removed from a chamber, to have a protecting sleeve or screen around the tubing in order that the latter may not be dented or otherwise deformed.

It is also an advantage of a preferred construction in connection with any one or more of the various embodiments, to have adjustable flow restricting, or shut-off, means at the outlet nozzle of the device such that the hydrogen flow may be cut-off at the point where it leaves the open end of the hydrogen permeable tubing or the passageway, and enters the outlet nozzle for communication with pressure indicating means.

It has been found that palladium and platinum, both of which are premeable to hydrogen, permit an increased rate of diffusion or passage of hydrogen when maintained at elevated temperatures, thus where the gaseous mixture containing the hydrogen is at a temperature which is relatively low, say less than 500° F., it is desirable to heat either the gaseous mixture or the hydrogen permeable tubing in order that relatively rapid hydrogen penetration may be obtained, and in turn greater sensitivity attained for the measuring device. Various means may be provided for heating the hydrogen permeable membrane or tubing in connection with a hydrogen analyzing device, however, in a preferred embodiment, electrical heating means, which is external of the passageway for the gaseous mixture, is provided with an insulated block type of construction. A preferred form of heated type of hydrogen analyzer also utilizes a thermostat or other temperature sensitive type of device to connect with an electrical heating coil such that the latter may be regulated and controlled to provide a desired temperature within the insulated block and in turn maintain a desired temperature at the zone of the hydrogen permeable tubing.

The improved construction and arrangement of hydrogen analyzing apparatus as provided by the present invention, and additional features and advantages thereof, will be more apparent upon reference to the accompanying drawing and the following description thereof.

Figure 1 of the drawing is a sectional view through a diagrammatic and simplified form of device having a hydrogen permeable tube coiled within a tubular housing or chamber adapted to accommodate the flow of a gaseous mixture.

Figure 2 of the drawing is a partial sectional view through a modified form of simplified device having a coiled hydrogen permeable tubing communicating with a hydrogen outlet nozzle which is at the end of the tubular housing or chamber.

Figure 3 indicates in a sectional elevational view, another embodiment of the improved apparatus utilizing the small hydrogen permeable tubing. The latter being supported externally on a supporting rod which in turn is adapted to connect to and be inserted within a large conduit or chamber.

Figure 4 provides a diagrammatic cross-sectional view through a heated type of hydrogen analyzing apparatus, having a heat-conductive block removably holding a tubular gas sampling chamber or housing, an electrical heating coil, and thermostat means for regulating the heating of the supporting block and of the hydrogen permeable tube maintained within the gas sampling section.

Referring now to Figure 1 of the drawing, there is indicated an elongated tubular section or housing 1 having gas inlet and outlet means provided at the respective ends of the housing. A removable inlet port or nozzle section 2 is provided at one end of the housing 1 and a removable gas outlet port or nozzle piece 3 is provided at the opposite end thereof. At least one of these sections is made removable from tubular housing 1 in order that there may be ready access to the unit, or as will be more specifically described hereinafter, to provide for the removability for the tubular housing section 1 from an enclosing supporting block. In the present embodiment, each of the sections 2 and 3 have restricted diameter gas passageways therethrough to reduce the velocity of the flow of the gas mixture passing through the housing 1, and at the same time they are externally threaded in order that the device may be installed as a section of a gas conducting conduit, or alternatively placed within a by-pass conduit having a sample stream of the gas mixture pass therethrough.

Internally within the housing 1 is an extended section of the platinum or palladium tube 4, either of these metals being permeable to hydrogen. The tubing 4 has an internal closed end 5, such that the gaseous mixture in the housing 1 cannot enter directly into the interior tubing 4, while an open end 6 is provided in a manner extending to or through a passageway 8 in the wall of the housing 1 and thus discharge directly to a hydrogen outlet nozzle 7. The present embodiment provides silver solder 9 around the open end of the tube 6 and over the passageway 8 opening, so that the open end 6 of the tube 4 and the interior of the hydrogen outlet nozzle 7 is sealed from the interior of the housing 1 and the gas mixture therein, however, other than soldering means may be used for sealing the open end of tubing into the passageway 8 and into communication with the hydrogen outlet nozzle 7. A portion of a conduit or tube 10 is indicated as connecting with the hydrogen outlet nozzle 7, in a manner providing means for communicating the hydrogen partial pressure with suitable pressure indicating means. Inasmuch as the partial pressure of the hydrogen stream is to be measured and compared to the pressure of the total gas stream flowing through the interior of housing 1 and in contact with the exterior of the hydrogen permeable tube 4, a hydrogen partial pressure indicating means may be suitably calibrated to in turn provide direct readings of the percentage concentration of hydrogen in the gas stream.

In the present embodiment of Figure 1, the platinum or palladium tubing 4 is held in position by having the open end thereof extend through the passageway 8 and being sealed or soldered to the housing 1, while the extended length of the tubing is formed in a coil, which if desired may be of a continuous helical form, suitable to slip into the interior of the tubing or housing 1. In this arrangement, the housing or tubing 1 substantially supports the coiled tubing 4, however, where the hydrogen permeable tubing 4 is not in a slip fit type of coil then additional supporting means may be incorporated within the interior of the housing or in contact with the small diameter tubing 4 so that the latter is properly held in position within the gas passageway. It may be again noted, that while the present embodiment indicates a single coil of hydrogen permeable tube, that one or more tubular members may be utilized within the gas passageway for exposure to the hydrogen containing mixture and thus provide a relatively large surface area to be exposed to the penetration of the hydrogen in the mixture. Also, as previously noted, the hydrogen permeable tubing is preferably of small diameter sizes and of a small internal bore, which may approximate capillary tubing sizes, with generally a total extended length of at least several inches.

In Figure 2 of the drawing there is indicated the end portion of a housing of 1' and one end of a small diameter hydrogen permeable tubing 4'. In this modification, the gas mixture outlet is provided through a nozzle 11 which connects with the side of the housing or passageway chamber 1', and the tubing 4' has an open end 12 which extends through the end of housing 1' into communication with a passageway 13 and an outlet nozzle 14. A support and seal plate 15 is provided with a small passageway accommodating the open end of the tubing and silver solder or other sealing means is provided around tubing end 12 in order to suitably seal the gas mixture within the housing 1' from passing into the passageway 13 and into the hydrogen outlet nozzle 14. The sealing and supporting plate 15 may in turn be welded to the end of housing 1' or otherwise sealed and connected thereto. The hydrogen outlet nozzle 14 is in turn adapted to connect with a suitable tubing or small conduit 17 which is connective with pressure indicating means, whereby the partial pressure of the hydrogen may be suitably measured.

Referring now to Figure 3 of the drawing, there is indicated means for holding the small diameter hydrogen permeable tubing 18 within a large chamber or large conduit 21 which in turn accommodates a large quantity of the gaseous mixture in which it is desired to have the hydrogen concentration measured. A tube supporting rod 18 has a flange 19 welded or otherwise connected thereto such that the analyzing device may be inserted into and held in a pressure tight manner to a nozzle, such as 20 which in turn communicates with the interior of the conduit or chamber 21. The interior end of the supporting rod 18 is cut back slightly to provide a smaller diameter section 22 in order to accommodate a coiled hydrogen permeable tubular member 23. The interior end of the hydrogen permeable tubing 23 has a closed end 24 terminating near the interior end of the supporting rod, while the opposite and exterior end of the tubing 23 passes through a suitable passageway 25 extending internally through at least a portion of the supporting rod 18. The passageway 25 is sealed around the tubing 23 at the point at which it enters the passageway by means of silver solder 26, or other suitable sealing means, and this prevents the gaseous mixture within the conduit or chamber 21 from entering into the passageway 25 and to the outlet means therefrom.

As in the other described embodiments, the hydrogen permeable tubing 23 is of platinum or palladium so that the hydrogen may penetrate the wall thereof and into the interior of the small bore internal diameter tubing. The exterior open end 27 of the tubing 23 terminates at the exterior end of the passageway 25 adjacent suitable hydrogen outlet means.

In the present embodiment, the external end of the passageway 25 enlarges into a flared seat-like portion 28, and into a tapped section 29 which accommodates a threaded bolt or screw-like member 30. The latter has a tapered or pointed end 31 adapted to fit into the seat-like flared portion 28. This construction and arrangement permits the screw member 30 to be turned and closed against the seat 28 and thus shut off the hydrogen flow from the instrument, as well as throttle and regulate the flow of the hydrogen stream from the end of the unit. Accessibility to the screw member 30 is made through an enlarged section or recess 32 which in turn is tapped to accommodate a removable cap screw 33. A gasket 34 is also indicated in the drawing between the lower face of the cap 53 and the exterior end of the supporting rod 18 in order to insure a pressure tight connection.

The hydrogen which permeates through the wall of the permeable tubing 23 passes through the interior thereof to the open end 27 and through the flared section around the adjustable screw-member 31 and into a passageway 35 which in turn connects with a hydrogen outlet nozzle 36. In this embodiment, the latter is threaded and provides means for connecting with a small conduit or pipe which in turn connects with suitable pressure indicating means, not shown, for determining the hydrogen partial pressure. The valve or flow adjusting means such as provided with this embodiment may also be provided in connection with the hydrogen outlet nozzles of the previously described embodiments of Figures 1 and 2. However, the shut-off or regulating valve arrangement is particularly desirable in connection with the embodiment of Figure 3 in that the latter is adapted to be inserted within a large pipe or conduit or into a reaction chamber, where it may be difficult to control the flow of the gaseous mixture and in turn stop the flow of hydrogen through the permeable member and through the hydrogen outlet which in turn connects with the pressure indicating means. While in the embodiments of Figures 1 and 2, the tubular housing or chamber is in general positioned within or as part of a by-pass conduit or sampling conduit, such that the gas flow is normally controlled or capable of being shut off from the entire instrument during such periods that it may be desirable to shut off the flow from the hydrogen outlet nozzle and to the pressure indicating means.

Another feature of the embodiment of Figure 3 is a protecting sleeve 37 which is perforated and adapted to cover the coiled portion of the hydrogen permeable tubing and thus protect and prevent damage to the small diameter tubing when the unit is being placed into or removed from a chamber, or in addition, to protect the tubing from the impact or pressure of catalyst in a bed thereof, where such packed material is maintained in the chamber into which the device is inserted. The lower end of the protecting sleeve 37 has a threaded portion 38 adapted to screw on a threaded stem-like piece 39 at the lower end of the supporting rod 18. There is also indicated a lock-nut 40 which is suitable to hold the sleeve portion in place around the tubing 23 and the lower recessed end 22 of the supporting rod. The interior portion of the supporting rod as well as the protecting sleeve 37 is of a heat resistant metal suitable to withstand the high temperature conditions as well as the chemical components in the gaseous mixture, or alternatively, of a refractory type of temperature resistant material, such as porcelain and the like.

Referring now to Figure 4 of the drawing, there is shown a heated type of hydrogen analyzer, and in accordance with the present invention the hydrogen analyzing section utilizes a small bore and a small diameter hydrogen permeable tubing with a closed end thereto for exposure to and contact with a mixed gaseous stream having hydrogen therein, whereby the concentration may be automatically determined for the use of the present instrument. As previously set forth, both palladium and platinum are more permeable to hydrogen at elevated temperatures, and it is thus desirable to have heating means in connection with the device so that the hydrogen permeable tubing may be raised to an elevated temperature and thus still further increase the efficiency and rapid operation of the instrument. One embodiment of the heated unit, as provided by Figure 4, provides a tubular chamber or housing 4 for the mixed gas flow, and the tubular chamber 41 may be of a general form of construction of that shown in Figure 1 of the drawing. Removable gas inlet means 42 at the end of the chamber section 41 provides means for removing the latter from connection with the sample or gas inlet line and in turn permits the entire removal of chamber 41 from a suitable heat conductive block 43. Preferably an electrically heated coil 44 is housed within the block 43 and is relatively close to or adjacent the tubular gas conducting housing 41 in order that heat may be conducted directly thereto and in turn elevate to a high temperature the hydrogen permeable tubing 45 which is coiled within the gas passageway. The tubing 45 has one open end which connects with the hydrogen outlet means 46, and the latter is connective with suitable pressure indicating means as set forth in the other embodiments. A preferred embodiment also utilizes a suitable automatically operating thermostat 46 within the block 43 and adjacent to heating coil 44, so as to regulate the heating of the coil 44 to a desired elevated high temperature and to in turn regulate the heating of the platinum or palladium tubing 45 in the gas sampling chamber 41. The heating coil 44 shows diagrammatically wires 48 supplying electric power thereto while thermostat 47 is provided with wires 49 which in turn connect, in a manner not indicated in the present drawing, to the electrical power wiring 48, in order to regulate or turn off the current thereto and maintain a desired elevated temperature in the block 43. The entire heat conductive block 43 is provided with a suitable insulating material 50 in order that a high temperature, say of the order greater than 500° F. may be attained therein to in turn heat the hydrogen permeable tubing 45 and maintain the desired increased penetration of hydrogen into the interior tubing.

A preferred construction also provides means for removably inserting or removing the heating coil 44 and the thermostat 47, as well as for removing the gas sampling chamber 41 as hereinbefore noted, so that all portions of the improved heated type of embodiment may readily be replaced or inspected. In an alternative construction, the heat conductive block 43 may be of a bolted and split construction such that it may in effect be opened to remove or replace the gas conduction chamber 41, the heating coil 44, or the thermostat 47. It is a feature of the present embodiment of the invention to provide heating means which externally heats the gas sampling chamber, such as 41, and preferably by means of an electrical resistance coil which is adjacent to the gas sampling tube; however, the heating coil may be positioned circumferentially around the gas sampling chamber 41 rather than merely adjacent thereto, as indicated in Figure 4 of the drawing.

There are, of course, additional minor variations which may be made in the design and construction of one or more embodiments of the present invention, however, to briefly recapitulate, the present invention provides for the use of small diameter and small bore hydrogen permeable tubing, with means for supporting or maintaining an extended length thereof in contact with a gaseous mixture in which it is desired to measure the hydrogen concentration, and passageway means for connecting and communicating an open end of the hydrogen permeable tubing to a hydrogen outlet nozzle which is positioned exteriorly of the supporting means or housing having the gaseous mixture flow therethrough.

There are various chemical processing operations which involve the use of hydrogen, including various catalytic petroleum conversion operations, so that an instrument or apparatus providing a direct indication of the hydrogen concentration present in a gaseous or vaporous mixture within a reaction zone is particularly desirable. It is, however, desirable to operators that the indication of hydrogen concentration follow as closely as possible actual operating conditions, without any substantial lag between processing conditions and the concentration indicated by the instrument. Thus, it is a particular advantage of embodiments of the present invention, over prior type of instruments, to utilize extended lengths of small diameter hydrogen permeable tubing and thus furnish a small volume hydrogen collecting zone on the interior thereof for separating the hydrogen partial pressure, while providing a relatively large ratio of surface area to this small internal volume.

Where the analyzer is used in connection with low total pressures, the palladium or platinum tubing should be evacuated, since any gas other than hydrogen would give a wrong partial pressure reading. However, at high pressures, this effect is not appreciable.

In a case of extremely low hydrogen concentration in a mixed gaseous stream, a differential pressure indicator may be used to give a difference in pressure between the partial hydrogen pressure and the total pressure. The total pressure would be indicated, or recorded, in addition to the differential pressure, and normally would also be controlled at a set value. The differential pressure could then be calibrated in terms of mol percent of hydrogen.

I claim as my invention:

1. Apparatus for measuring hydrogen concentration in a gaseous mixture and having in combination, a pressure tight chamber having an inlet and outlet thereto for accommodating said gaseous mixture, an extended coiled length of small diameter hydrogen permeable tubing having a closed end and an open end, means holding said small diameter tubing within said housing whereby the exterior surface and closed end of said tubing is in contact with said gaseous mixture flowing through said chamber, a passageway through and extending from said pressure tight chamber connective with the open end of said tubing, a hydrogen outlet nozzle on the exterior of said chamber communicative with said passageway, and the open end of said tubing, whereby said nozzle may connect with pressure indicating means, a heat transmitting block supporting said chamber, heating means imbedded within said block and separate from and adjacent to said chamber, and a heat control means within said block adjacent said heating means, whereby to provide controlled heating of said chamber from said heating means and the heating of said hydrogen permeable tubing with said chamber.

2. The apparatus of claim 1 further characterized in that said hydrogen permeable tubing is of palladium.

3. The apparatus of claim 1 further characterized in that said hydrogen permeable tubing is of platinum.

4. The apparatus of claim 1 further characterized in that said heating means comprises an electrically heated coil and said heat control means comprises a thermostat connecting with an electric power source to said heated coil.

5. Apparatus for measuring hydrogen concentration in a gaseous mixture and having in combination, a pressure tight chamber having a removable gas inlet and a removable gas outlet connecting thereto for accommodating the flow of said gaseous mixture, an extended coiled length of small diameter hydrogen permeable tubing having a closed end and an open end, means holding said small diameter tubing within said chamber whereby the exterior surface and closed end of said tubing is in contact with said gaseous mixture flowing through said chamber, a passageway through and extending from said pressure tight chamber connective with the open end of said tubing, a hydrogen outlet nozzle on the exterior of said chamber communicative with said passageway and the open end of said tubing, a removable heat transmitting block encasing said chamber, removable heating means imbedded within said block separate from and adjacent to said chamber, and removable heat control means within said block adjacent said heating means, whereby to provide controlled heating of said chamber within said block and the heating of said hydrogen permeable tubing within said chamber.

HERBERT A. HULSBERG.

References Cited in the file of this patent

UNITED STATES PATENTS

| Number | Name | Date |
| --- | --- | --- |
| 2,456,163 | Watson | Dec. 14, 1948 |
| 2,536,610 | King et al. | Jan. 2, 1951 |

OTHER REFERENCES

Article: "Use of Palladium Tube in Gas Analysis," by A. G. Fleiger—in "Industrial and Engineering Chemistry," vol. 10, No. 9, Sept. 1938 (pages 544–547).